United States Patent Office 2,713,585
Patented July 19, 1955

2,713,585
MANUFACTURE OF ORGANOTIN TRIMERCAPTIDES

Chris E. Best, Franklin Township, Summit County, Ohio

No Drawing. Original application October 5, 1950, Serial No. 188,653. Divided and this application June 4, 1953, Serial No. 362,951

9 Claims. (Cl. 260—429)

This invention relates to novel compounds which are monoorganotin trimercaptides, which compounds are useful, inter alia, as heat stabilizers in vinyl chloride polymers and copolymers.

SYNOPSIS OF THE INVENTION

The compounds of this invention are embraced by the formula

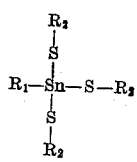
(I)

in which formula $R_1$, independently in each occurrence, represents an organic radical consisting of from 1 to 22 carbon atoms, hydrogen, carbon-carbon single bonds, carbon-hydrogen bonds (optionally), aromatic ring carbon-carbon double bonds and (also optionally) a maximum total of four innocuous structures such as carbon-carbon triple bonds, aliphatic carbon-carbon double bonds, ether linkages, thioether linkages, carboxylic ester groups bonded to carbon atoms, fluorine atoms linked to carbon, and halogen atoms bonded to aromatic ring carbon atoms, and $R_2$, independently in each occurrence, represents an organic radical consisting of from 1 to 22 carbon atoms, hydrogen, carbon-carbon single bonds, carbon-hydrogen bonds (optionally), aromatic ring carbon-carbon double bonds, and (also optionally) a maximum total of four innocuous structures such as carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon atoms, carboxylic amide groups bonded to carbon atoms, fluorine atoms bonded to carbon atoms, halogen atoms bonded to aromatic ring carbon atoms, and groups of the formula

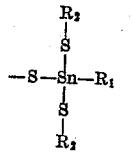
(I-A)

under the same notation.

In the above and all following formulae, the atoms in the groups $R_1$ and $R_2$ attached to the sulfur and tin atoms must always be carbon atoms. It will also be understood that the innocuous groups mentioned as optional constituents of the radicals $R_1$ or $R_2$ need not all be identical in any given radical $R_1$ or $R_2$, but their total number, enumerated without distinction as to kind of innocuous group, must not exceed four in any given radical $R_1$ or $R_2$.

The compounds may conveniently be prepared by reacting mercaptans of the formula $$R_2\text{—}S\text{—}H \quad (II)$$

with organostannic acids of the formula

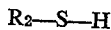
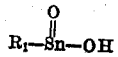
(III)

all under the notation given in convention with Formula I above. Water is eliminated, with formation of the desired compounds (I).

THE SUBSTITUENTS $R_1$ AND $R_2$

The groups $R_1$ and $R_2$ in the formulae above may be substantially any substituents which (a) are not too large for convenient synthesis and reactivity and (b) do not contain any groups which will interfere with the synthesis or existence of the compounds. It will be understood, of course, that the atoms in the radicals $R_1$ and $R_2$ attached to the sulfur and tin atoms must be carbon atoms. In practice, a range of from 1 to 22 carbon atoms in each of the radicals $R_1$ and $R_2$ will cover the field of radicals which will be conveniently available and not too large to be readily reactable in the synthesis of the compounds of this invention. The radicals $R_1$ and $R_2$ may be, and from the standpoint of ready procurement and avoidance of complications in synthesis preferably are, simple monovalent hydrocarbon radicals containing only single bonds between the carbon atoms or aromatic ring double bonds between the carbon atoms (practically, there will be a maximum limit of 11 such double bonds in any radical), for instance alkyl, cycloalkyl, aryl, aralkyl, alkaryl and like monovalent hydrocarbon radicals containing from 1 to 22 carbon atoms. Likewise these radicals, in addition to simple hydrocarbon structure, may contain various other groupings which are sufficiently low in number, and of sufficiently non-reactive character, as not to interfere with the synthesis of the compounds of this invention. Structures which have been found innocuous and non-interfering in either of the radicals $R_1$ and $R_2$ are, inter alia, aliphatic ethylenic linkages (as distinguished from the unsaturated bonds in aromatic rings, which may be present in numbers limited only by the size of the radical $R_1$ or $R_2$ in question) acetylenic linkages, ether linkages, thioether linkages, carboxylic ester linkages, fluorine atoms bonded to carbon atoms, and halogen atoms bonded to aromatic ring carbon atoms. The radical $R_2$, in addition to the above innocuous groups, will also tolerate other groups such as hydroxyl groups, sulfhydryl groups and carboxylic amide groups. Likewise, the radical $R_2$ may be linked through sulfur atoms to more than one organic substituted tin atom, in which case the radical $R_1$ of Formula I will contain a further group of the formula

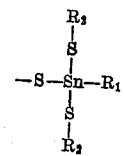
(I-A)

in addition to the tin atom grouping of this character already shown in Formula I. It will be understood that the groups $R_2$ in the Formula I-A admit of expansion, so as to include network polymeric materials of the type

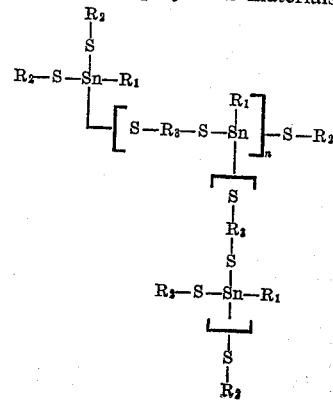
(IV)

wherein $R_3$ is a divalent organic radical satisfying the criteria of the radical $R_2$ as above defined, save in that $R_2$ is monovalent, $R_1$ and $R_2$ are as above defined, with the understanding that $R_2$ may be further expanded into structures involving $R_3$-linked branched and network chains such as illustrated, and $n$ in each occurrence is an integer from 1 to a practical (there would be no theoretical) limit of 10. In general, it has been found that from 1 to 4 of the innocuous groups set forth above may be present in each of the radicals $R_1$ and $R_2$ in the formulae above.

Of all the radicals coming within the ambit of $R_1$ and $R_2$ as above defined, the simple hydrocarbon radicals containing not more than a combined total of four non-aromatic ethylenic linkages and acetylenic linkages will be preferred, as the starting materials for these compounds will be most readily accessible, and less complications will be encountered in the synthetic steps leading to the compounds of this invention.

It has also been observed in the practice of this invention that tertiary mercaptans react less readily and completely than do other mercaptans in the formation of the compounding of this invention. The resultant mercaptides therefore constitute a less preferred class of compounds in accordance with this invention, while nevertheless remaining within the ambit thereof.

It is to be understood, of course, that the radicals $R_1$ and $R_2$ in their several occurrences need not be, and in many cases are not, identical with each other, but may be different radicals each individually coming under the definition of such radicals as given above; and that a preparation in accordance with this invention need not be a pure compound but may be a mixture of compounds each coming under the general Formula I above, such as would result, for instance, when starting materials were used which would supply mixtures of radicals, for instance starting materials derived from natural sources or from petroleum fractions.

THE PREPARATION OF THE COMPOUNDS OF THIS INVENTION

A convenient synthesis for the compounds of this invention involves the reaction

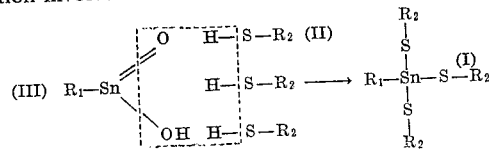

wherein $R_1$ and $R_2$ are as defined above in connection with Formula I. It will be understood that the Formula III for the organostannic acid is somewhat idealized, since these compounds occur largely as pyro acids of varying degrees and complexity of condensation; however, the pyro acids mercaptolize fairly readily under the conditions of the reaction, which therefore proceeds effectively as shown. In some preparations of organostannic acid, the degree of condensation may be so high as to result in somewhat reduced yields, and it will be preferred to employ acids of a relatively low degree of condensation. It is to be understood that in many cases the three mercaptan molecules indicated by the notation "H—S—$R_2$" are identical mercaptan molecules, assuming that an unmixed mercaptan is supplied to the reaction; if a mixture of mercaptans is supplied to the reaction, these will distribute themselves, in accordance with the reactivities involved, between reactive engagements in which the mercaptan molecules reacting with a given organostannic acid are all identical, and those in which the mercaptan molecules are not all identical (e. g. two alike and one dissimilar, or all three dissimilar) and are arranged at the several positions on the tin atom in various complexions. In accordance with the notation above, the radicals $R_2$ may themselves contain thiol groups, i. e., the mercaptan (II) may have the formula HS—$R_3$—S—H as $R_3$ is defined above in connection with Formula IV, in which case a greater or less proportion of the mercaptan (II) will react with two organostannic acid molecules (III) resulting in reticulate structures such as indicated by Formula IV. The reaction is readily and simply carried out by mixing the mercaptans (II) together with the organostannic acid (III) and heating the mixture with stirring at temperatures in the range 40° C.–180° C. In most cases the mercaptans will not be volatile under these conditions and the reaction may be carried out in open vessels; however, some of the lower mercaptans may have appreciable, or even superatmospheric vapor pressures at these temperatures, in which case the reaction may be carried out in closed vessels with provision for reflux and, if necessary to confine the reactants, maintenance of superatmospheric pressure. The reaction is more readily controlled if not all the organostannic acid is added at the outset, but rather is added in increments as the reaction proceeds. The reactants will be used in substantially equivalent proportions, as the reaction is substantially quantitative; however to the extent that the proportionation may be inaccurate, the mercaptan should be used in excess, as the organostannic acid is usually more expensive ingredient and, in the case of organostannic acids manufactured by certain techniques devised by associates of the present patentees, will be lost along with the salt which accompanies it as an incident of its manufacture. Economic or technical considerations may in many cases bring about a reversal of these recommendations in particular cases. The reaction goes very rapidly, giving a good yield almost instantly upon mixing, and going substantially to completion in the course of an hour or so. The reaction may be carried out in the absence of a solvent, since the mercaptan employed will usually be a liquid, or at least fusible at the temperature of reaction. Alternately, a suitable nonreactive solvent may be employed, such as hydrocarbon solvents on the order of petroleum ether, benzene, toluene, xylene or the like, or chlorinated solvents such as carbon tetrachloride, trichloroethylene, tetrachloroethylene, hexachlorobutadiene, and the like. When a solvent is employed, it may be evaporated out of the reaction mass to entrain and remove the water resulting from the reaction.

As noted above the radicals $R_1$ and $R_2$ are not critical in nature and may be selected from a wide variety of substituents, examples of which are listed. The radicals $R_2$ are derived from the mercaptan or mercaptans supplied to the reaction, while the radicals $R_1$ are those attached to the tin atom in the organostannic acid supplied to the reaction. Given herewith are selected lists of mercaptans and organostannic acids conforming to the requirements of the radicals $R_1$ and $R_2$ given above. Any one of these or similar mercaptans may be reacted with any of these or similar stannones to yield compounds according to this invention.

Table I

Mercaptans:
  Methyl mercaptan
  Butyl mercaptan
  Amyl mercaptan
  n-Hexyl mercaptan
  2-ethyl hexyl mercaptan
  tt-Octyl mercaptan
  Decyl mercaptan
  Dodecyl mercaptan
  Mixed mercaptans derived from fatty radicals of cocoanut oil or other natural fatty oils
  Mercaptans from trimerized isopropylene
  Mercaptans containing the alkyl radicals of kerosene petroleum fractions
  Tridecyl mercaptan
  Oleyl mercaptan
  Thioabietinol, or other mercaptans derived from the hydrocarbon residues of naval stores products, tall oil, etc.

Mercaptans derived by conversion to mercaptans of the alcohols produced by the carbon monoxide-hydrogen synthesis, or of the mixed alcohols produced by the "oxo" process
Mercaptans produced by reduction of the alkyl sulfonic acids resulting from ultraviolet-sulfuryl chloride treatment of paraffins
2-mercaptoethanol
2(2-mercaptoethoxy) ethanol
2-ethyl hexyl thioglycolate
2-mercaptoethyl stearate
2-mercaptoethyl stearamide
Eicosyl mercaptan
Benzyl mercaptan
o-, m-, and p-Chlorobenzyl mercaptan
4,4'-diphenylether dithiol
Thiophenol
o-, m-, and p-Chlorothiophenol
Thio-p-cresol
α-Thionaphthol
β-Thionaphthol
Thiophenethiol
Mercaptobenzimidazole
Thiosalicyclic acid
Thiocinnamic acid
2-mercapto methyl benzoate
p-Bromothiophenol
p-Trifluoromethyl thiophenol Table II Organostannic acids:
  Methylstannic acid
  Ethylstannic acid
  Butylstannic acid
  Isobutylstannic acid
  n-Hexylstannic acid
  2-ethylhexyl stannic acid
  Laurylstannic acid
  Alkylstannic acid in which the alkyl groups are the mixed alkyl groups derived from cocoanut oil
  n-Hexadecyl stannic acid
  Phenylstannic acid
  α-Naphthyl stannic acid
  2-thienyl stannic acid
  Xenyl stannic acid
  Ethoxyethyl stannic acid The compounds prepared in accordance with this invention are for the most part liquids at ordinary temperatures, although some of them may be solids. They are useful as intermediates in the production of other compounds, and find particular use as stabilizers in vinyl chloride resins.

EXAMPLE I

Mercaptan (per Table III) _____ Gram-mole .3
Organostannic acid (per Table III) _____ .1

A series of monoorganotin trimercaptides was prepared by reacting together, in combinations set forth in Table III hereinbelow, .3 gram-mole portions of various mercaptans with .1 gram-mole portions of various organostannic acids. In each case the selected mercaptan was placed in an open beaker and heated to 125° C. (In those cases where the mercaptan was volatile, e. g. butyl mercaptan, the reaction was carried out in a closed vessel under reflux with a water trap, rather than in an open beaker.) The selected organostannic acid was then added with continuous stirring, in small portions, as rapidly as the foaming would permit. After all the organostannic acid had been added, and foaming had subsided, the tem- Table III

| Constitution of Product | | Properties of Product | | Amount Used (parts by weight) | Color of Test Specimen After Exposure in Oven For— | | | | | Run No. |
|---|---|---|---|---|---|---|---|---|---|---|
| Group Attached To Tin In Organostannic Acid Used | Groups Attached To Sulfur In Mercaptan Used | Melting Point, °C. | $n_D^{20}$ | | 15 Min. | 30 Min. | 60 Min. | 90 Min. | 120 Min. | |
| Methyl | Butyl | | 1.5541 | 2.0 | off-white | pale straw | straw | tan | tan | 1 |
| | sec. amyl | | 1.5452 | 2.0 | ----do---- | straw | ----do---- | ----do---- | ----do---- | 2 |
| | Cocoanut¹ | | 1.4975 | .25 | pale straw | pale straw | pale straw | straw, brown edges. | tan, brown edge. | 3 |
| | | | | .5 | white | off-white | ----do---- | straw | straw | 4 |
| | | | | 1.0 | ----do---- | ----do---- | ----do---- | light tan | tan | 5 |
| | t-dodecyl | | | 2.0 | ----do---- | white | off-white | pale straw | light tan | 6 |
| | octadecyl | 50-60 | | 2.0 | cream | pale straw | pale straw | straw | brown | 7 |
| | | | | 2.0 | off-white | off-white | off-white | off-white | pale straw, black edge. | 8 |
| | alpha pinene mercaptan² | | 1.5449 | 2.0 | ----do---- | ----do---- | straw | straw | straw | 9 |
| | 2-hydroxy-ethyl | | 1.6168 | 2.0 | ----do---- | faint straw | light straw | light straw | straw, black edge. | 10 |
| | alpha naphthyl | | 1.71 | 2.0 | ----do---- | off-white | straw | straw | ----do---- | 11 |
| | p-cresyl | 143-145³ | | 2.0 | faint yellow | pale straw | ----do---- | light brown | brown | 12 |
| | methylbenzoate | | 1.6579 | 2.0 | pale straw | light tan | brown | dark brown | black | 13 |
| | chlorobenzyl | | 1.6523 | 2.0 | white | white | off-white | pale straw | straw, black spot. | 14 |
| Ethyl | diphenyl-ether dithiol² | | | 2.0 | faint yellow | faint yellow | yellow | yellow | muddy yellow. | 15 |
| | Cocoanut¹ | | 1.4991 | 2.0 | white | white | white | white | pale straw | 16 |
| Butyl | Butyl | | 1.5420 | 2.0 | off-white | off-white | light straw | tan | brown | 17 |
| | Cocoanut¹ | | 1.5009 | 2.0 | white | ----do---- | off-white | off-white | pale straw | 18 |
| | t-Dodecyl | viscous liquid | | 2.0 | cream | pale straw | pale straw | straw | brown | 19 |
| | p-Cresyl | | | 2.0 | white | off-white | straw | straw | light brown | 20 |
| | Methylbenzoate | stiff, resinous product. | 1.6540 | 2.0 | light beige | light reddish brown. | light brown | brown | brown | 21 |
| Cocoanut¹ | Cocoanut¹ | | | 2.0 | off-white | off-white | pale straw | pale straw | straw | 22 |
| | p-Cresyl | | 1.4920 | 2.0 | ----do---- | ----do---- | ----do---- | straw | dark brown | 23 |
| Phenyl | Butyl | | 1.5710 | 2.0 | off-white | ----do---- | ----do---- | straw | straw, black | 24 |
| | Cocoanut¹ | | 1.5124 | 2.0 | white | ----do---- | off-white | off-white | off-white, black edges. | 25 |
| Thienyl | p-Cresyl | | 1.6890 | 2.0 | off-white | ----do---- | pale straw | light tan | black | 26 |
| | Cocoanut¹ | | 1.4729 | 2.0 | ----do---- | ----do---- | dirty straw | dirty tan | dark brown | 27 |
| Control without stabilizer. | | | | 0 | tan | dark tan | brown | dark brown | ----do---- | 28 |

¹ These are mixed fatty radicals, consisting largely of lauryl and myristyl, derived by reduction of the fatty acids of cocoanut oil.
² This is the name of the mercaptan employed, not the group attached to sulfur therein, as set out in the column heading.
³ Recrystallized from heptane. Analysis indicated 18.93% sulfur as against a theoretical 19.1% sulfur.

perature was raised to 150° C., held at this point for 15 minutes, and then reduced to 25° C. The cooled reaction mass was filtered to remove any unreacted material (in some cases, the organostannic acid contains insoluble salts and stannic oxide), and the filtrate taken as a substantially pure monoorganotin trimercaptide in which the organic groups directly attached to the tin were those originally present in the organostannic acid, and the organic groups linked to the tin through the sulfur atoms were those originally present in the mercaptans employed. (In some cases, where the products were highly viscous or solid, the reaction mass was diluted with petroleum ether for the filtration, the solvent being stripped off after the filtration.)

The products were then tested as stabilizers in vinyl chloride resins as follows: (The parts given are by weight.)

| | Parts |
|---|---|
| Copolymer of 97% vinyl chloride, 3% vinylidene chloride | 100 |
| Di(2-ethylhexyl)phthalate | 46 |
| Tricalcium phosphate | 1 |
| Silicate pigment | 1 |
| Stabilizer compound under test | 2 |

A series of compositions was made up in accordance with the foregoing schedule, using as the stabilizer each of the organotin trimercaptides prepared as above described and tabulated below. In each case the listed ingredients, together with the compound under test, in the proportions indicated in the schedule were thoroughly mixed together and placed on a laboratory roll mill at 320° F. Milling was continued for two minutes, at which time the gauge was set at .025 inch and the sheet removed from the mill and cooled.

Five one-inch square specimens of each of the sheets of each of the compositions prepared as above described were hung vertically in a forced-draft oven maintained at 170° C. Specimens of each of the compositions were removed after intervals of 15, 30, 60, 90 and 120 minutes of exposure in the oven, and were rated subjectively as to color and extent of deterioration by the operator, which ratings are set forth herewith in Table III opposite the tabulation of the preparation of the compounds of this invention. By way of contrast, a composition in accordance with the above formula, but omitting the stabilizer, showed marked deterioration after as short a time as 15 minutes in the oven, see the last item in Table III.

From the foregoing general discussion and detailed specific examples, it will be evident that this invention provides a novel series of organotin trimercaptides which are readily prepared from inexpensive and abundantly available starting materials by the use of simple equipment and techniques. The compounds have excellent stabilizing action on vinyl chloride resins.

What is claimed is:
1. Process which comprises reacting an organostannic acid of the formula

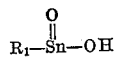

with a mercaptan of the formula

R₂—SH in which formulae R₁ represents an organic radical consisting of from 1 to 22 carbon atoms, hydrogen, carbon-carbon single bonds, carbon-hydrogen bonds, from 0 to 11 aromatic ring carbon-carbon double bonds, and from 0 to 4 innocuous structures selected from the group consisting of carbon-carbon triple bonds, aliphatic carbon-carbon double bonds, ether linkages, thioether linkages, carboxylic ester groups bonded to carbon atoms, fluorine atoms bonded to carbon atoms, and halogen atoms bonded to aromatic ring carbon atoms, and R₂ represents an organic radical consisting of from 1 to 22 carbon atoms, hydrogen, carbon-carbon single bonds, carbon-hydrogen bonds, from 0 to 11 aromatic ring carbon-carbon double bonds, and from 0 to 4 innocuous structures selected from the group consisting of carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon and carboxylic amide groups bonded to carbon atoms.

2. Process which comprises reacting methylstannic acid with the mercaptans derived from cocoanut oil fatty acids.

3. Process which comprises reacting butylstannic acid with the mercaptans derived from cocoanut oil fatty acids.

4. Process which comprises reacting phenylstannic acid with thio-p-cresol.

5. Process which comprises reacting phenylstannic acid with the mercaptans derived from cocoanut oil fatty acids.

6. Process which comprises reacting 2-thienyl stannic acid with the mercaptans derived from cocoanut oil fatty acids.

7. Process which comprises heating an organostannic acid of the formula

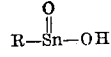

with a mercaptan of the formula

R'—S—H in which formulae R and R' are members of the group consisting of alkyl and aryl.

8. Process which comprises heating together methylstannic acid and lauryl mercaptan.

9. Process which comprises heating together ethylstannic acid and lauryl mercaptan.

References Cited in the file of this patent

Backer et al., Rec. trav. chim. 53 1061 (1935).
Organic Synthesis, vol. 21, page 36, line 6 to line 5, page 37 (1941).
Gilman, O. S. R. D. No. 548, dated May 2, 1942. Declassified to Open 1-28-46, pages 9, 12.
Hickinbottom, Reactions of Organic Compounds, page 130, lines 18-21, (1948).